United States Patent [19]

Lennon-Thompson et al.

[11] Patent Number: 4,950,164

[45] Date of Patent: Aug. 21, 1990

[54] DIET PLANNING AND CONTROL SYSTEM AND METHOD

[75] Inventors: Doris L. Lennon-Thompson, Yorktown Heights; Kathleen R. Raneri, Katonah, both of N.Y.

[73] Assignee: Kraft General Foods, Inc., Glenview, Ill.

[21] Appl. No.: 439,119

[22] Filed: Nov. 17, 1989

[51] Int. Cl.⁵ .................................. G09B 1/06
[52] U.S. Cl. ..................................... 434/127
[58] Field of Search ................ 434/127, 128, 129

[56] References Cited

U.S. PATENT DOCUMENTS

| | | |
|---|---|---|
| 2,314,387 | 3/1943 | Carlsson .............................. 434/127 |
| 3,491,715 | 1/1970 | Longarini ......................... 434/127 X |
| 3,977,106 | 8/1976 | Kapp . |
| 4,310,316 | 1/1982 | Thomann . |
| 4,460,179 | 7/1984 | Hafer ................................ 434/127 X |
| 4,606,555 | 8/1986 | Adams . |
| 4,625,675 | 12/1986 | Rosenberg . |
| 4,650,218 | 3/1987 | Hawke . |
| 4,652,241 | 3/1987 | McCarty . |
| 4,689,019 | 8/1987 | Tilney ................................ 434/127 |
| 4,690,019 | 9/1987 | Daghe et al. . |
| 4,828,498 | 5/1989 | Tilney . |
| 4,832,603 | 5/1989 | Basil . |

Primary Examiner—Richard J. Apley
Assistant Examiner—Rachel M. Healey
Attorney, Agent, or Firm—Thomas R. Savoie; Daniel J. Donovan

[57] ABSTRACT

A diet planning system and method providing a plurality of sets of cards, the cards of each set having a common code, preferably a color code. Within each set there are a plurality of cards for each meal. By selecting on a given day a give color coded set, and substituting freely to select any card within a meal group, the dieter will be provided with information for complete meals on that day which satisfy the dieter's macronutrient and micronutrient goals at a plurality of different calorie intake levels. The different sets can provide variety or be provided for a special purpose, such as special days, i.e., weekend days, special diets, or special dieters, such as for children or teenagers.

14 Claims, 6 Drawing Sheets

FIG. 3

| FIG. 3a |
|---------|
| FIG. 3b |
| FIG. 3c |

FIG. 3a

| RED Breakfast 2 | 1200 Calories | 1500 Calories | 1800 Calories | 2100 Calories |
|---|---|---|---|---|
| Breakfast | | | | |
| Banana | 1/2 small | 1/2 small | 1/2 small | 1 small |
| Natural Bran Flakes | 1 cup | 1 cup | 1 cup | 1 cup |
| Cinnamon Raisin Toast | none | 1/2 slice | 1 slice | 1 slice |
| Margarine | none | 1 tsp. | 1 tsp. | 1 tsp. |
| Skim or 1% Lowfat Milk | 1 cup | 1 cup | 1 cup | 1 cup |
| Coffee or Decaffeinated Coffee | * | * | * | * |

* As desired

RED LUNCH 2

Lunch

| | 1200 Calories | 1500 Calories | 1800 Calories | 2100 Calories |
|---|---|---|---|---|
| Tuna Pita Pocket, mix together: | | | | |
| Tuna, water-packed, drained | 1/2 cup | 1/2 cup | 1/2 cup | 1/2 cup |
| Shredded Romaine | 1/2 cup | 1/2 cup | 1/2 cup | 1/2 cup |
| Bean Sprouts | 1/4 cup | 1/4 cup | 1/4 cup | 1/4 cup |
| Chopped Celery | 1 tbsp. | 1 tbsp. | 1 tbsp. | 1 tbsp. |
| Chopped Onion | * | * | * | * |
| Reduced Calorie Mayonnaise, place in Whole Wheat Pita | none | 2 tsp. | 2 tsp. | 1 tbsp. |
| Oatmeal Raisin Nut Cookies | none | none | none | 3 |
| Grapes | 12 | 12 | 12 | 12 |
| Lemonade Flavor Drink Mix | sugar free * | regular 8 fl. oz. | regular 8 fl. oz. | regular 12 fl. oz. |

* As desired

RED Dinner 2

*Dinner*

| | 1200 Calories | 1500 Calories | 1800 Calories | 2100 Calories |
|---|---|---|---|---|
| Turkey Tenderloin with Mustard Sauce** | 1 serving | 1 serving | 1 serving | 1 serving |
| Linguini | 1/2 cup | 1/2 cup | 1 cup | 1 cup |
| Margarine | none | 1 tsp. | 1 tsp. | 1 tsp. |
| Parsley | * | * | * | * |
| French Cut Green Beans | 1/2 cup | 1/2 cup | 1/2 cup | 1 cup |
| Whole Wheat Roll | none | none | 1 small | 1 small |
| Margarine | none | none | 1 tsp. | 1 tsp. |
| Sliced Orange and Red Onion Salad | | | | |
| Romaine Lettuce | 1/2 cup | 1/2 cup | 1/2 cup | 1/2 cup |
| Orange Sliced | 1 small | 1 small | 1 small | 1 small |
| Red Onion Rings | 3 | 3 | 3 | 3 |
| Salad Dressing Mix | no-oil, 2 tsp. | regular, 2 tsp. | regular, 2 tsp. | regular, 1 tbsp. |
| Vanilla Flavor Dessert | none | none | 1 | 1 |

*Snacks*

| | | | | |
|---|---|---|---|---|
| Orangey Yogurt Drink** | 1 serving | 1 serving | 1 serving | 1 serving |

*As desired
**Recipe Follows

DIET PLANNING AND CONTROL SYSTEM AND METHOD

FIELD OF THE INVENTION

This invention relates to diet planning and control, and more specifically it relates to a new and improved diet planning system and method which provides the dieter with food consumption information which is both specific to detailed menu information and sufficiently flexible to permit variation.

BACKGROUND OF THE INVENTION

The public is increasingly more conscious of the importance of a proper diet for health maintenance and disease prevention. However, the numerous different and often conflicting dietary goals are so complex that it is very difficult if not impossible for the average person (referred to below as a "dieter") to understand and fully implement an optimum diet planning and control system. For example, such a diet which maximizes health concerns would control the intake of cholesterol and different types of fats, as well as calories, while optimizing levels of macronutrients (e.g., protein, carbohydrates and fats) and micronutrients (e.g., vitamins and minerals) and providing adequate dietary fiber.

The problem of planning and controlling a healthful diet goes beyond the usual health concerns and exists with respect to special diet situations such as cardiovascular disease and diabetes.

Until now, any assistance available to the dieter has been of limited utility, leaving too much additional planning in the hands of the dieter who usually lacks knowledge in the field of nutrition and hence is incapable of fully and properly implementing a completely adequate diet. More specifically, prior approaches to the planning and control of a person's diet have supplied the dieter with general food and beverage categories which should be consumed; for example, meat, vegetables, milk, fish, etc. However, dieters do not consume general food and beverage categories; they consume only specific food and beverage items. However, specific food and beverage items which are actually available to the dieter are so diverse in comparison with each other that it is difficult if not impossible for the average dieter to convert broad categories into specific foods and beverages, i.e. to plan actual diets, while still maintaining control over all of the above-described parameters.

These prior approaches have included various physical devices to assist the dieter in counting or otherwise planning his or her diet. These have included manipulatable devices as shown for example in U.S. Pat. Nos. 4,606,555 and 4,625,675 and various coupon and label systems as shown for example in U.S. Pat. Nos. 4,310,316; 4,652,241; and 4,689,019. However, since these devices, coupons, labels, and the like relate only to the control of broad food and beverage categories, they do not solve the problem addressed above of assisting the dieter by providing a plan for consuming specific food and beverage items which satisfy all of the complex goals of a healthy diet.

One procedure for providing a diet which is highly specific to certain foods and beverages is simply to provide a single fixed list for meals on a given day. However, a mere fixed list has the disadvantage of being too rigid and therefore rapidly becoming boring to the dieter after a relatively short period of time. In contrast thereto, a successful diet comprised of specific food and beverage items must include a mechanism for providing sufficient versatility to maintain the interest of the dieter for an extended period of time.

Thus, a need exists for a system and method which will provide to the dieter highly specific food and beverage information which will satisfy all of the complex health goals of the dieter, including meeting requirements for calories, cholesterol, macronutrients and micronutrients, which is sufficiently flexible to permit day-to-day variation of the selected foods and beverages within the plan and which is embodied in a mechanism which can be easily and conveniently utilized by the dieter.

SUMMARY OF THE INVENTION

It is a purpose of the present invention to provide a new and improved system and method for planning and controlling a diet which overcomes the disadvantages of the prior art as known heretofore. This purpose of the present invention is achieved by providing a diet planning and control system wherein specific food and beverage meal information is provided on a card. The system comprises sets of coded cards wherein all of the cards of a given set have a common code which relates them to each other and distinguishes them from the codes of the other sets. In a preferred embodiment of the invention, the code is a color code wherein all of the cards of a given set have a common color.

All or a majority of the sets of cards comprise a plurality of subsets, each subset being related to a specific eating occasion or meal for a complete day. For example, a set may include four subsets including breakfast cards, lunch cards, dinner cards, and snack cards. Alternatively, dinner and snack information can be combined in a single card. Breakfast and lunch could also be combined into a single card to provide a brunch, in this circumstance, obviously, no other breakfast or lunch would be consumed on that day. Likewise, a dinner and snack could be combined on a single card to provide for an eat-out dinner and preclude consumption of a separate snack.

In addition, a minority of the sets can be structured differently to provide for special days or to provide for complete control over a given day's diet. For example, a single card within these sets might provide specific menus for a complete day consisting of a light breakfast, a brunch, a dinner and a snack or consisting of a brunch, a holiday dinner and one or more snacks. Thus, for any of these minority sets there are no subsets of cards, merely a plurality of cards each of which sets forth a complete menu for all eating occasions in that day.

Each and every card contains not merely broad categories but in fact, very precise information as to the specific food and beverage to be consumed and the volume thereof. Each card will typically include a table which provides the correct volume of those specific foods and beverages for each of a plurality of different daily calorie totals. One or more of the cards may include recipe information on the back side thereof which corresponds with one or more of the specific foods listed on the front side of the card.

The present invention achieves flexibility by so designing each of the subsets within a given set that within that set and subset, i.e. within that color code and meal occasion, one card can be substituted for another. For example, assuming that a given set has four subsets, the planned diet can include a breakfast from any of the breakfast cards, a lunch from any of the lunch cards and so on throughout the day. Each card with a subset, although structured similarly to each other in terms of color code and designated meal would of course contain substantially different specific menus as compared to the other cards within that subset. Individual cards within a subset, such as the lunch subset, could set forth foods which are common to a restaurant menu but which are nutritionally equivalent to other cards within the subset, so that an eat-out meal card (e.g., eat-out lunch) could be included in a set. Considering all permutations and combinations which are possible using just three subsets, each subset having four different cards, it is apparent that wide variation in the specific food and beverage content of each day is possible.

To provide further flexibility, any number of sets, each with a totally different color code, can be provided. Each of the different sets would of course contain different specific foods. An important feature of the present invention is that only within a given set, i.e. a given color code, without substituting from other codes, one can substitute freely in any given meal, i.e. a breakfast for a breakfast, a lunch for a lunch, etc. and still for the entire day achieve the goal of the diet in terms of calorie level and other dietary parameters.

As noted above, the additional sets, i.e. the additional color codes, can provide totally different food and beverage information, thus substantially increasing the versatility and flexibility of the diet. However, the additional sets can also serve an entirely different purpose. Special sets can be provided for special situations. For example, several basic sets could cover the usual routine of breakfast, lunch, dinner and snack. Special sets, which could include multiple subsets, could then be provided for special situations such as Sundays and holidays with eye-opener or continental breakfast meals, brunch, dining out and/or family dinners. Still other sets can be provided for special situations such as diets for young children and teenagers and still other sets can be provided for special health conditions such as diabetes.

The cards could be coded in any convenient way. Preferably they would be color coded. The color could be on the margin, actually written out and/or used in the Printing of all of the information thereon. The cards should preferably be constructed so that they are easily stored and handled. For example, the cards could be kept in a file box or on a "Rolodex" for easy access by the dieter and of a size sufficient for the dieter to select the appropriate cards for the day and carry those cards with him or her for the day.

It will be apparent that the diet can be created to satisfy many health goals. In a preferred arrangement directed to the current health concerns of the day, a diet would be constructed which controls the amount of cholesterol, total fat, saturated, monounsaturated and polyunsaturated fats, carbohydrates, proteins, fiber, sodium, vitamins and minerals. The diet could be formulated to control more, less or different nutrient factors. The diet could also be used to lose, control or increase weight depending on the daily calorie level selected.

The system will preferably be designed to meet dietary guidelines for most major health organizations by providing adequate nutrient delivery, i.e., macronutrients and micronutrients, and by meeting the Recommended Daily Allowances.

To be more specific, following a diet plan recommended by major health organizations such The National Cholesterol Education program (NCEP) of the National Heart Blood and Lung Institute (NHBLI), the fat content of a diet should be less than 30% of the total calories with saturated fats being less than 10%, polyunsaturated fats up to 10% and monounsaturated fats between 10-15%. Carbohydrates should be 50-60% of the calories and protein between 10-20% of the total calories. The cholesterol level should be less than 300 mgs. per day. The specific food and beverage information which achieves these goals would be provided for different total calorie levels for the day, for example 1200 calories, 1500 calories, 1800 calories and 2100 calories. The recommended plan would preferably strive for 20-30 gms. of fiber per day, an additional dietary recommendation from the National Cancer Institute. A plan should also keep sodium intake between 1100 and 3300 mg on average per day, d achieve at least 66% of the Recommended Daily Allowances of vitamins and minerals.

The objects and advantages of the present invention will become more apparent from the detailed description to follow.

BRIEF DESCRIPTION OF THE DRAWINGS

There follows a detailed description of preferred embodiments of the present invention which are to be read together with the accompanying drawings, wherein:

FIG. 3 is an enlarged view with complete details of three of the cards in FIG. 1.

DETAILED DESCRIPTION OF THE PREFERRED EMBODIMENTS

Referring to the figures, like elements are represented by like numerals throughout the several views.

In accordance with the present invention, highly specific food and beverage information for each meal is provided on a series of cards. The cards are created and organized in sets, wherein each set has a specific code. In the preferred embodiment, the code is a color code. The food and beverage information on the cards of a set, i.e. on cards of a given code such as a specifically color coded set of cards, must order to assure that for that day various dietary goals have been met. In a preferred embodiment, this means satisfying several macronutrient and micronutrient requirements for a given day, for a given calorie intake.

The present invention includes a plurality of sets of cards. The sets in addition to the first set can be provided for several reasons. One reason is to provide further flexibility, providing the dieter with whole different sets of food and beverage selections, still meeting the desired macronutrient and micronutrient requirements.

In addition, however, these different sets can serve entirely different purposes from the first set. For example, one or more sets could provide information for the typical three meal plus snack meal day while other sets could provide information for non-typical days such as a weekend day or a holiday. Also, additional sets can be provided for children and teens or for totally different dietary goals from the initial basic sets.

It would also be possible to include in the diet planning and control system of this invention one or more sets which would have a single, fixed diet for a daily menu (e.g., only one breakfast, lunch, dinner or snack). In this manner, total control over a given day's diet could be obtained. The total daily diet could, if desired, be printed on a single card.

Figure 1:
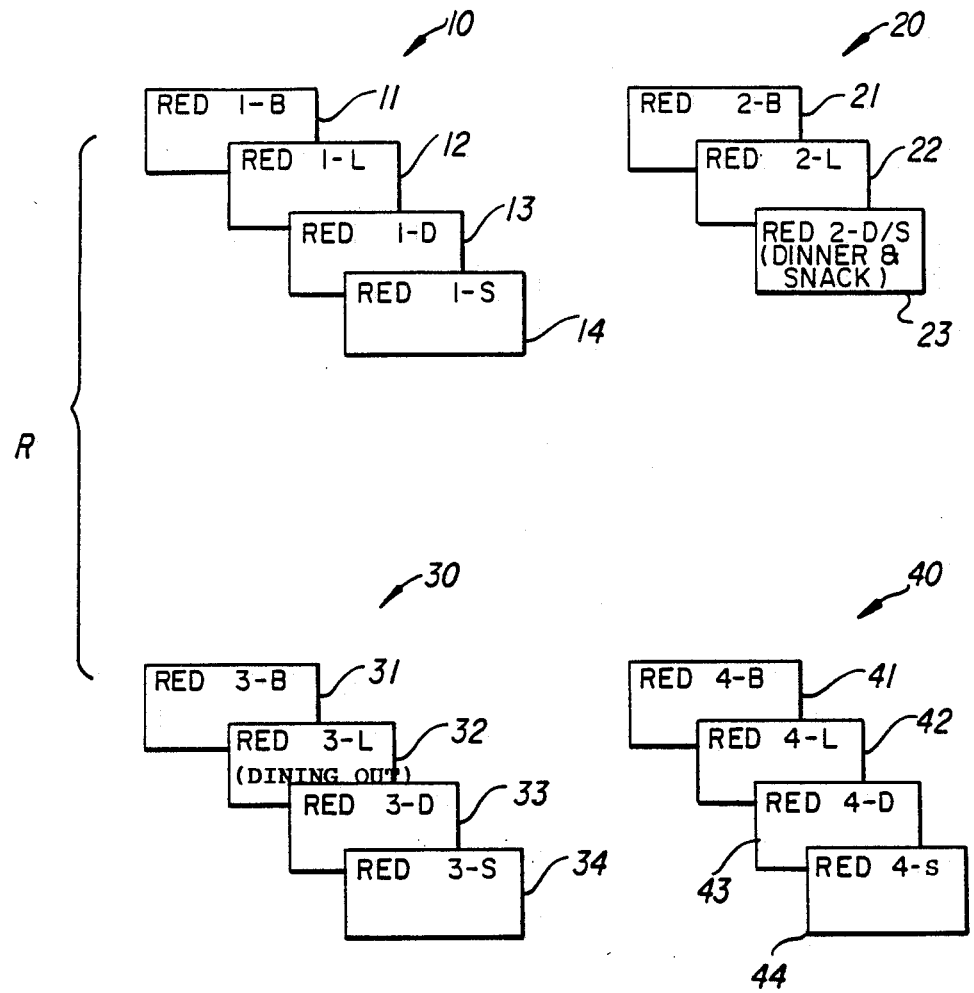
FIG. 1 is a diagrammatic view illustrating one set of diet planning and control system coded cards, arranged into four daily menus, including four subsets and a plurality of cards within each of the subsets.

FIG. 1 illustrates one complete set R of dietary cards. The set R is defined by a common code, in this case the color red. Within each set there is a plurality of subsets containing a complete food and beverage information for a given eating occasion in order to satisfy the requirements of a given dieter. In set R illustrated in FIG. 1, there are four subsets consisting of four breakfast cards, 11, 21, 31 and 41, four lunch cards, 12, 22, 32 and 42, four dinner cards, 13, 23, 33 and 43, one, 43, with an included snack, and three snack cards, 14, 34 and 44. As depicted in FIG. 1, the red cards are arranged into four daily menus 10, 20, 30 and 40. Each of the cards within a subset is numbered, for example 1 to 4 for the breakfast cards within the red set. Subsets do not have to contain the same number of cards and one or more cards within a subset could provide for special meals such as a dining-out lunch as in card 32. The dietary goals of card 32 must, however, be equivalent to other lunch cards 12, 22 and 42 within the subset if substitution of one red lunch for another is permitted.

In order to simplify formulation of the diet, some or all of the dinner cards within a set, such as card 23, could contain information for both dinner and snack occasions. In this event, a separate snack card would not be combined with a dinner/snack card in order to construct a daily menu. A snack which is assigned to a dinner may be eaten at any time of day but may not be replaced with a separate snack card or a snack from another dinner/snack card.

As shown, daily menus 10, 20, 30 and 40 contain like-numbered cards 11-14, 21-23, 31-34 and 41-44, respectively. It is a feature of the present invention however, that for flexibility, i.e variation in the planning of a diet for a given day, so long as the dieter uses only cards within a given set, i.e within a given color code, the dieter may substitute cards within a given subset For example, the dieter would initially plan a breakfast using any one of the red breakfast cards 1 through 4. However, having picked a numbered breakfast card, the dieter need not stay with that number for the remainder of the day. The dieter can then look to any of the four numbered lunch cards. A similar substitution can be made for dinner and snack. As noted above, for convenience, within a set all cards providing information for a given meal, for example, all breakfast cards, will be referred to as a subset of cards. Thus, for example, cards 11, 21, 31 and 41 together provide a subset of breakfast cards. Similarly, cards 12, 22, 32 and 42 constitute a subset of lunch cards. Similar groups are apparent with respect to dinner and snack except that card 23 combines dinner and snack. In fact, any number of subsets can include dinner and snack in one card rather than separately In that case, there would be provided a subset of cards comprising a plurality of dinner/snack cards All cards within a given subset would be designed so as to be essentially equivalent with respect to meeting the desired dietary goals.

Figure 2:
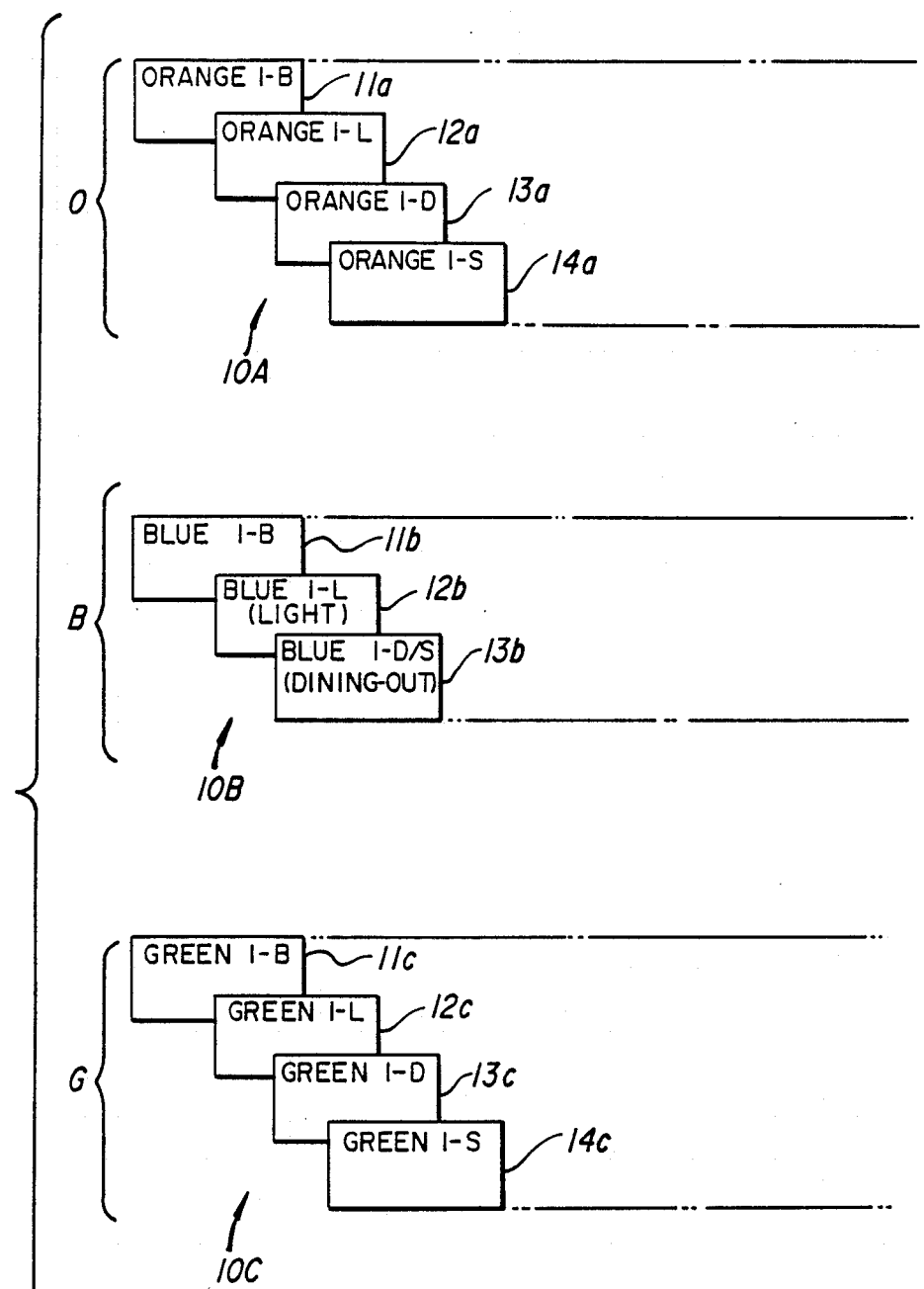
FIG. 2 illustrates diagrammatically only the initial cards in three additional sets of coded cards, each set having its own code.

FIG. 2 illustrates diagrammatically and only partially the provision of additional sets O, B and G, i.e. additional complete sets of cards having completely different color codes For example, set O, the orange set, has illustrated thereon only one daily menu 10A. Similarly, set B, the blue set, has illustrated only one daily menu 10B Finally, set G, the green set, has illustrated only one daily menu 10C. It is to be understood that each of these sets O, B and G continues, as indicated by the dotted lines to the right, to provide additional daily menus such as would correspond to 20, 30 and 40 of FIG. 1. In each of these sets O, B and G, the individual cards, although not illustrated, are understood to carry the same numeral as their respective cards in FIG. 1, but followed by a lower case subscript letter a, b, and c, respectively.

The difference, of course, is that in each of the three additional sets O, B and G the specific food and beverage information on each respective card would be different from the other sets. Consequently, even if a dieter chose like-numbered cards from the Red set R, i.e. cards 11-14 on a first day, and then on the next day chose like-numbered cards of the orange set O (cards 11a-14a) the dieter will have achieved versatility by having selected a substantially different combination of food and beverage items.

It is an important feature of the present invention that the information provided on each and every card is specific food and beverage information, and not merely broad categories. To illustrate this, the cards of daily menu 20, i.e. cards 21, 22 and 23, are illustrated in complete detail in FIG. 3. The upper left of each card provides the color code (Red), the meal and the number (in this case the numeral "2"). Down the left hand margin is provided a specific list of foods and beverages. Reading across the card very precise quantities are provided for each of a number of different calorie levels. The size, sex and dietary demands of any given dieter will determine which of the calorie columns are followed.

Figure 4:
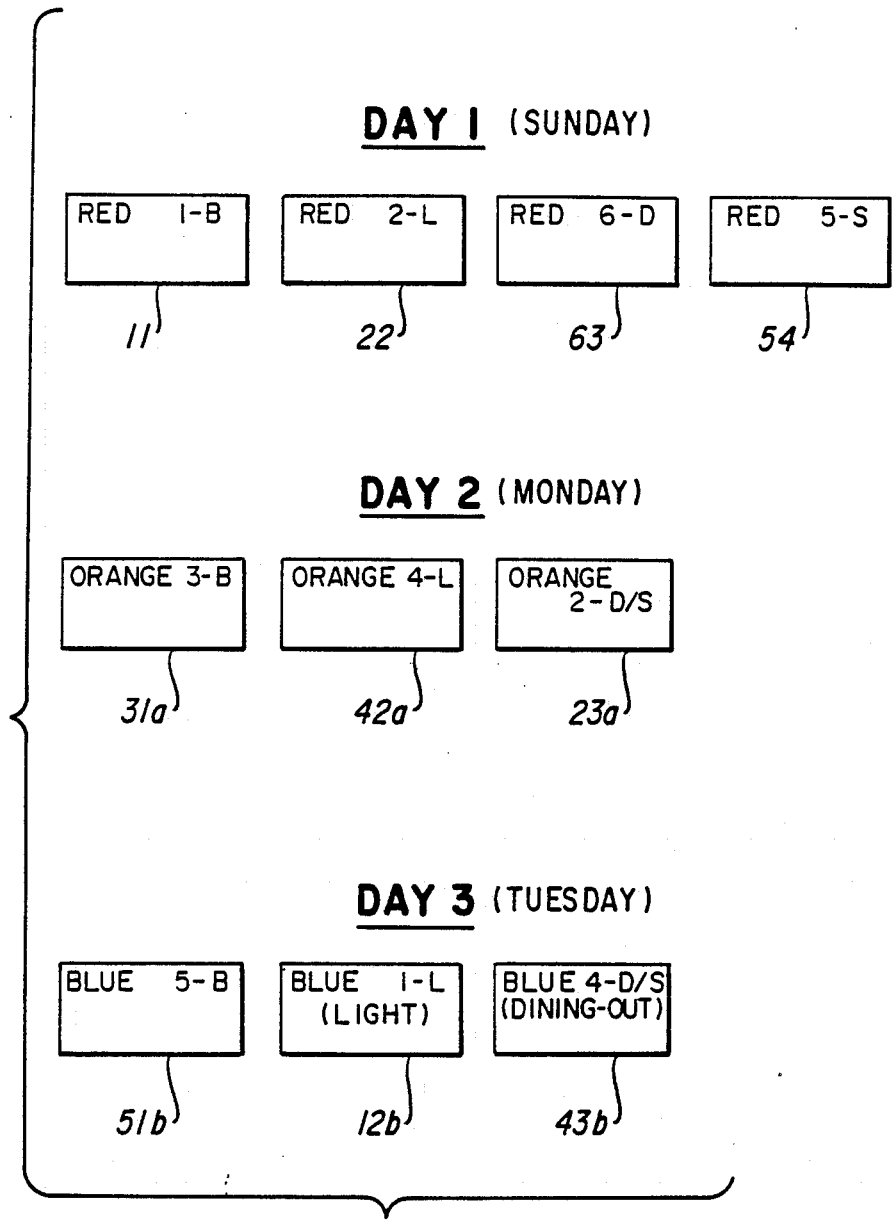
FIG. 4 illustrates diagrammatically a selection of diet planning and control system cards for three different days, selected from different combination of the sets of cards of FIGS. 1 and 2.

FIG. 4 illustrates how a dieter would typically select cards in planning a diet for several days. In this embodiment, Day 1 is a Sunday. Thus, the dieter might initially choose Red Breakfast 1, card 11, followed by Red Lunch 2, card 22, and then substitute Red dinner 6, card 63 followed by Red snack 5, card 54. On Day 2, a typical Monday, the dieter might for variety turn to the orange coded set O, selecting card 3 for breakfast, card 31a, card 4 for lunch card 42a and then card 2 for dinner and snack, card 23a.

Assume that on Tuesday the dieter plans to eat dinner out and eat a light lunch. Assume also that the Blue set is designed for such eating occasions. On this day the dieter might select Blue Breakfast 5 as a breakfast, card 51b, then Blue Lunch 1 for a light lunch, card 12b, followed by a dining-out Blue dinner/snack, for example card 43b.

For each of Days 1, 2 and 3, the selection has stressed the ability to substitute one card for another within each coded set. However, it will generally be equally convenient to simply remain within a given subset.

In practice, one would not generally construct all of the different sets with the same structure. Rather, the different sets would more likely fulfill substantially different purposes. For example, two or three sets could provide cards containing only food and beverage information for structured days, breakfast, lunch, dinner and snack or conveniently the latter card in each set might generally combine dinner and snack. Then, one or two additional sets could be provided for special situations such as Saturdays, Sundays and holidays when the eating procedures of the dieter might vary considerably to include more dining out, family dinners, brunches, etc. Additionally, separate sets can be provided for completely different dietary goals. For example, the basic sets could achieve the goal of providing a diet characterized by controlling cholesterol and various types and amounts of fats for cardiovascular health, minimizing fat intake, etc. while additional sets could be provided for totally different dietary purposes such as weight control or general healthy eating. In addition, separate sets could be provided including completely structured days, weekend days, holidays or the like but geared especially to young children and/or teenagers, leaving the basic sets to provide information only for adults.

Although the invention has been described in considerable detail, it will be apparent that the invention is capable of numerous modifications and variations, apparent to those skilled in the art, without departing from the spirit and scope of the invention.

What is claimed:

1. A diet planning and control system for regulating the intake of calories, as well as a plurality of macronutrients and micronutrients, comprising:
    a plurality of sets of coded cards, all cards of each set having a common visually perceivable code which is common to all other cards of that set and visually distinguishable from the codes of the other sets of cards,
    within a majority of said sets, cards for at least three different eating occasions, there being a plurality of cards for most of the eating occasions in each set, any of which cards can be substituted for any other card within that eating occasion on any given day while still maintaining the desired level of calories, macronutrients and micronutrients, wherein said cards from each of said eating occasions are distinct,
    each card containing information which is specific to certain food and beverage items, these being all of the food and beverage items to be consumed by the dieter at that particular eating occasion,
    whereby a dieter, by consuming food and beverage during each day only as specifically set forth on cards within a single set, but freely substituting cards within each eating occasion of that set, consumes the desired level of calories, macronutrients and micronutrients.

2. A diet planning and control system according to claim 1, wherein the codes of each set are color codes, all cards within each set being coded by the same color, which is distinguishable from the color code of the other sets.

3. A diet planning and control system according to claim 2, the color codes constituted by the printing of the diet information in the coded color.

4. A diet planning and control system according to claim 2, which includes at least four sets.

5. A diet planning and control system according to claim 1, including cards for one eating occasion to provide breakfast food and beverage information, cards for a second eating occasion to provide lunch food and beverage information and cards for a third eating occasion to provide at least dinner food and beverage information.

6. A diet planning and control system according to claim 5, including within each set cards for a fourth eating occasion to provide snack meal food and beverage information.

7. A diet planning and control system according to claim 5, wherein the cards for the third eating occasion contain both dinner meal and snack meal food and beverage information.

8. A diet planning and control system according to claim 1, wherein the information on each card includes a different set of quantities of the food and beverage items for each of a plurality of different calorie levels.

9. A diet planning and control system according to claim 1, wherein some of said cards include recipe information on the back side thereof which corresponds with one of the certain foods on the front side of the card.

10. A method for controlling and regulating the intake by a dieter of calories as well as a plurality of macronutrients and micronutrients, comprising the steps of:
    taking, a plurality of sets of coded cards, all cards of each set having a common visually perceivable code which is common to all other cards of that set and visually distinguishable from the codes of other sets of cards, wherein a majority of said sets include cards for at least three different eating occasions, there being a plurality of cards for most of the eating occasions within each set, any one of which can be substituted for any other within that eating occasion on any given day, and wherein each card contains information which is specific to certain food and beverage items, these being all of the food and beverage items to be consumed by the dieter on that particular eating occasion,
    and selecting cards for each given day, including selecting an appropriate set of cards and then selecting the appropriate eating occasion cards within the selected set,
    whereby the selection of said cards by the dieter, and the consumption of food and beverage only as set forth on the selected cards will maintain a desired intake of calories, macronutrients and micronutrients for the dieter for that day.

11. A method according to claim 10, wherein the cards of each set are color coded, all cards within each set being coded by the same color which is distinguishable from the color code of the other sets, and wherein the step of selecting includes selecting for a given day within a given set a color-coded first eating occasion card to provide breakfast food and beverage information, a like color-coded second eating occasion card to provide lunch food and beverage information, and a like color-coded third eating occasion card to provide at least dinner food and beverage information.

12. A method according to claim 11, including selecting also a like color-coded fourth eating occasion card to provide snack food and beverage information.

13. A method according to claim 11, wherein the dinner and snack food and beverage information are provided on the same card.

14. A method according to claim 11, wherein the information on each card provides different sets of quantities of the food and beverage items for each of a plurality of different calorie levels, and further including selecting quantities for a given calorie level on each card.

* * * * *